United States Patent [19]

Elias, deceased et al.

[11] E Re. 31,221

[45] Reissued Apr. 26, 1983

[54] COLD ROLLED, DUCTILE, HIGH STRENGTH STEEL STRIP AND SHEET AND METHOD THEREFOR

[75] Inventors: James A. Elias, deceased, late of Middletown, Ohio, by June G. Elias, executrix; John R. Newby; Marvin B. Pierson, both of Middletown, Ohio

[73] Assignee: Armco Inc., Middletown, Ohio

[21] Appl. No.: 260,906

[22] Filed: May 6, 1981

Related U.S. Patent Documents

Reissue of:

[64] Patent No.: 3,963,531
Issued: Jun. 15, 1976
Appl. No.: 554,158
Filed: Feb. 28, 1975

[51] Int. Cl.[3] ..... C22C 38/06; C22C 38/12

[52] U.S. Cl. ..... 148/31; 75/123 J; 148/31.5; 428/645; 428/653; 428/659; 428/684

[58] Field of Search ..... 148/12 F, 36, 31.5, 148/31; 75/123 J; 428/684, 653, 659, 645

[56] References Cited

U.S. PATENT DOCUMENTS

| | | | |
|---|---|---|---|
| 3,333,987 | 8/1967 | Schrader et al. | 148/2 |
| 3,544,393 | 12/1970 | Zanetti | 148/12 F |
| 3,645,801 | 2/1972 | Melloy et al. | 148/12 F |
| 3,721,587 | 3/1973 | Allten et al. | 148/36 |
| 3,753,796 | 8/1973 | Melloy et al. | 148/36 |
| 3,860,456 | 1/1975 | Repas | 148/12 F |

FOREIGN PATENT DOCUMENTS

| | | |
|---|---|---|
| 48-79722/73 | 10/1973 | Japan . |
| 48-81721 | 11/1973 | Japan . |

*Primary Examiner*—W. Stallard
*Attorney, Agent, or Firm*—Frost & Jacobs

[57] ABSTRACT

Cold reduced, annealed steel strip and sheet stock having 0.2% yield strength of 45 to 65 ksi with an elongation of at least 25%, or having a yield strength of at least 90 ksi with an elongation of at least 10%. A low carbon steel (0.02–0.10% C) typical of rimmed or drawing steel analysis is preferably vacuum degassed, and 0.02% to 0.18% columbium is added. The casting is hot rolled, coiled not higher than 1300° F., cold reduced 40% to 70%, and annealed at low temperature for a time sufficient to restore desired ductility without substantially decreasing yield strength.

14 Claims, 4 Drawing Figures

COLD ROLLED, DUCTILE, HIGH STRENGTH STEEL STRIP AND SHEET AND METHOD THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention:

This invention relates to cold reduced, low carbon, low alloy steel strip and sheet having high yield strength in combination with ductility higher than that previously attainable and to a method for production thereof. More specifically, the present invention provides cold rolled steel strip and sheet stock having a 0.2% yield strength of at least 90 ksi with an elongation in 2 inches of at least 10%, or a cold rolled strip and sheet stock having a 0.2% yield strength of 45 to 65 ksi with an elongation in 2 inches of at least 25%, the composition for each embodiment being substantially the same. The invention further relates to a metallic coated product having a steel substrate exhibiting the above properties.

2. Description of the Prior Art:

High strength cold rolled steel has generally been produced previously by either of two approaches. One approach is to make relatively large additions of strengthening elements such as manganese (greater than 1%) and silicon (greater than 0.3%) to a steel containing more than 0.1% carbon, together with lesser additions of other strengthening alloying elements such as titanium, columbium, zirconium, and vanadium. Annealing of such steel produces high yield strengths by precipitation hardening.

Another approach is to produce a high strength steel containing carbon and nitrogen (together with small amounts of strengthening alloying elements) and subject the steel to special annealing treatments which results in an only partially recrystallized microstructure.

In both the above approaches, high strength is achieved only at the sacrifice of ductility and formability.

U.S. Pat. 3,761,324, issued Sept. 25, 1973, to J. A. Elias and R. F. Hook, disclose hot rolled and cold rolled strip and sheet material having a wide range of mechanical properties. In this low carbon steel (maximum carbon content 0.015%), columbium is added in excess of the amount required to combine with all the carbon and free nitrogen, so that uncombined columbium is present. This patent contains a recognition that columbium retards the recrystallization rate, thereby making possible the production of high strength hot-dip metallic coated products. However, at the maximum yield strength of 90 ksi for the steel of that invention, the elongation is less than 10%.

U.S. Pat. 3,671,334, issued June 20, 1972, to J. H. Bucher et al, discloses a renitrogenized columbium-bearing steel, and cold rolled, strain-aged articles formed therefrom having a yield strength of 70 to 90 ksi. The process of this patent involves a cold reduction of at least 50%, annealing to restore ductility with a consequent reduction in yield strength to about 50 to 55 ksi, pe-straining and heat treating to obtain 70 to 90 ksi yield strength by precipitation hardening. Forming into articles follows the anneal to restore ductility and precedes the precipitation hardening heat treatment. Percent elongation values of about 20% maximum were obtained at a yield strength of about 70 ksi.

It is evident from the above background of the prior art that there is not now available a low carbon steel which can be cold reduced to obtain high yield strength and retain sufficient ductility to permit forming into articles of final use without subsequent strain-aging and precipitation hardening.

SUMMARY

It is a principal object of the invention to provide a low carbon, low alloy steel which in cold reduced and annealed condition exhibits a yield strength ranging from 45 to 65 ksi or at least 90 ksi, and sufficient ductility to permit bending and forming operations.

It is a further object of the invention to provide cold rolled, low carbon strip and sheet stock which can be metallic coated with aluminum, zinc, or alloys thereof, while maintaining a high yield strength.

Cold reduced, low carbon steel strip and sheet stock according to the present invention consists essentially of, by weight percent, from 0.02% to about 0.10% carbon, about 0.1% to about 0.9% manganese, 0.02% to about 0.18% columbium, residual phosphorus, sulfur, oxygen and nitrogen, up to about 0.1% silicon, about 0.01% to about 0.08% aluminum, and balance essentially iron except for incidental impurities. The columbium is substantially completely combined with carbon at room temperature.

The method of the invention comprises the steps of providing a vacuum degassed, fully killed, low carbon steel casting having the above composition, hot rolling to intermediate gauge, coiling at a temperature not higher than about 1300° F., removing hot mill scale, cold reducing to final gauge with a reduction in thickness of 40% to 70%, and annealing at a temperature amd for a time sufficient to restore ductility adequate to permit bending and forming without substantial decrease in yield strength.

Steel processed in accordance with one embodiment of the invention is preferably coiled after hot rolling at about 1000° to about 1300° F., and annealed after cold rolling under conditions which result in substantially recovered but unrecrystallized strip and sheet stock having a yield strength of at least 90 ksi and a percent elongation of at least 10%.

According to another embodiment, steel of the invention is preferably coiled at about 1000° to about 1300° F., and annealed after cold rolling under conditions which result in fully recrystallized strip and sheet stock having a yield strength of 45 to 65 ksi and a percent elongation of at least 25%.

BRIEF DESCRIPTION OF THE DRAWINGS

Reference is made to the accompanying drawings wherein FIGS. 1-3 are graphic representations of yield strength vs. annealing temperatures of steels processed in accordance with the invention.

DESCRIPTION OF THE PREFERRED EMBODIMENTS

Figure 1:
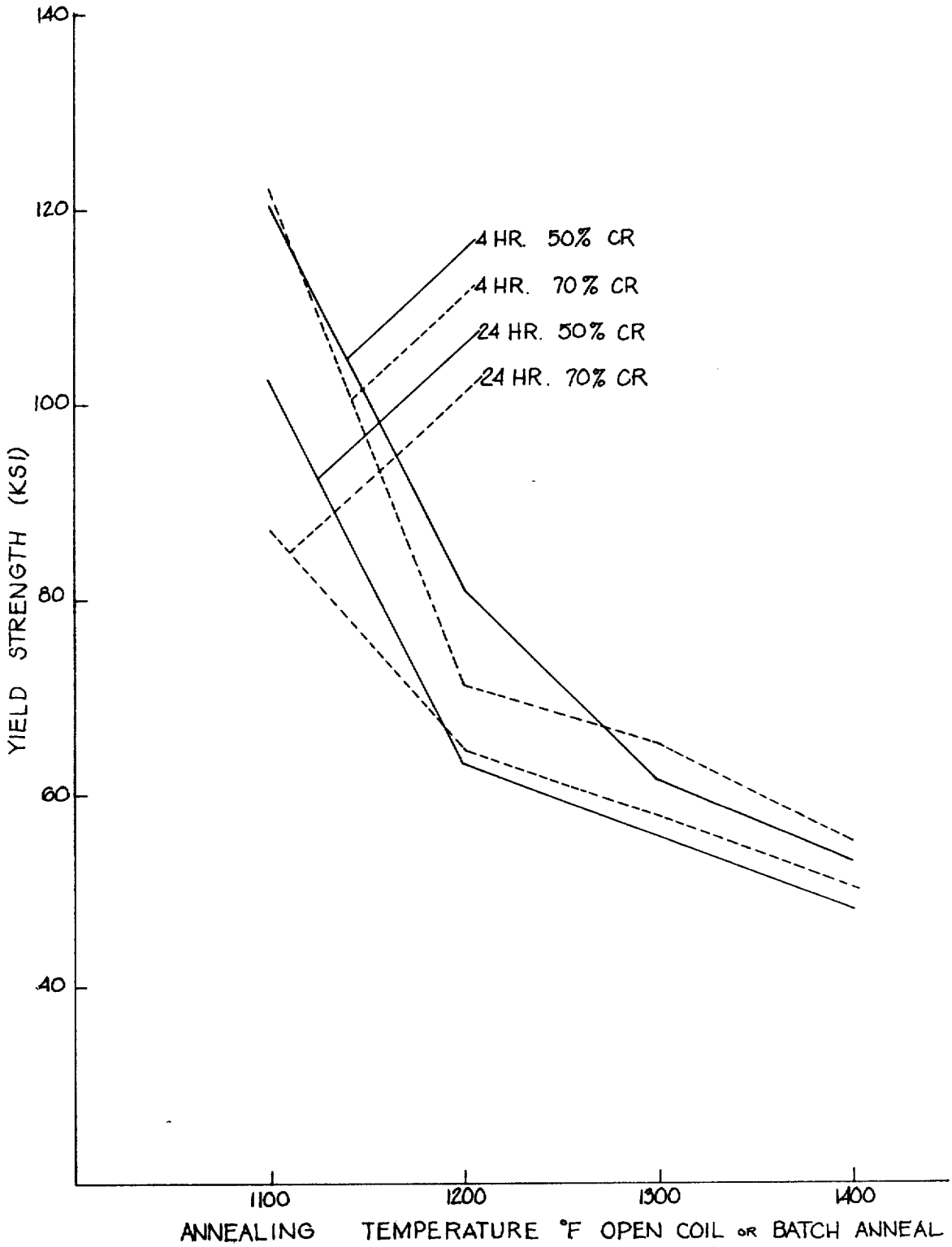
Figure 8:
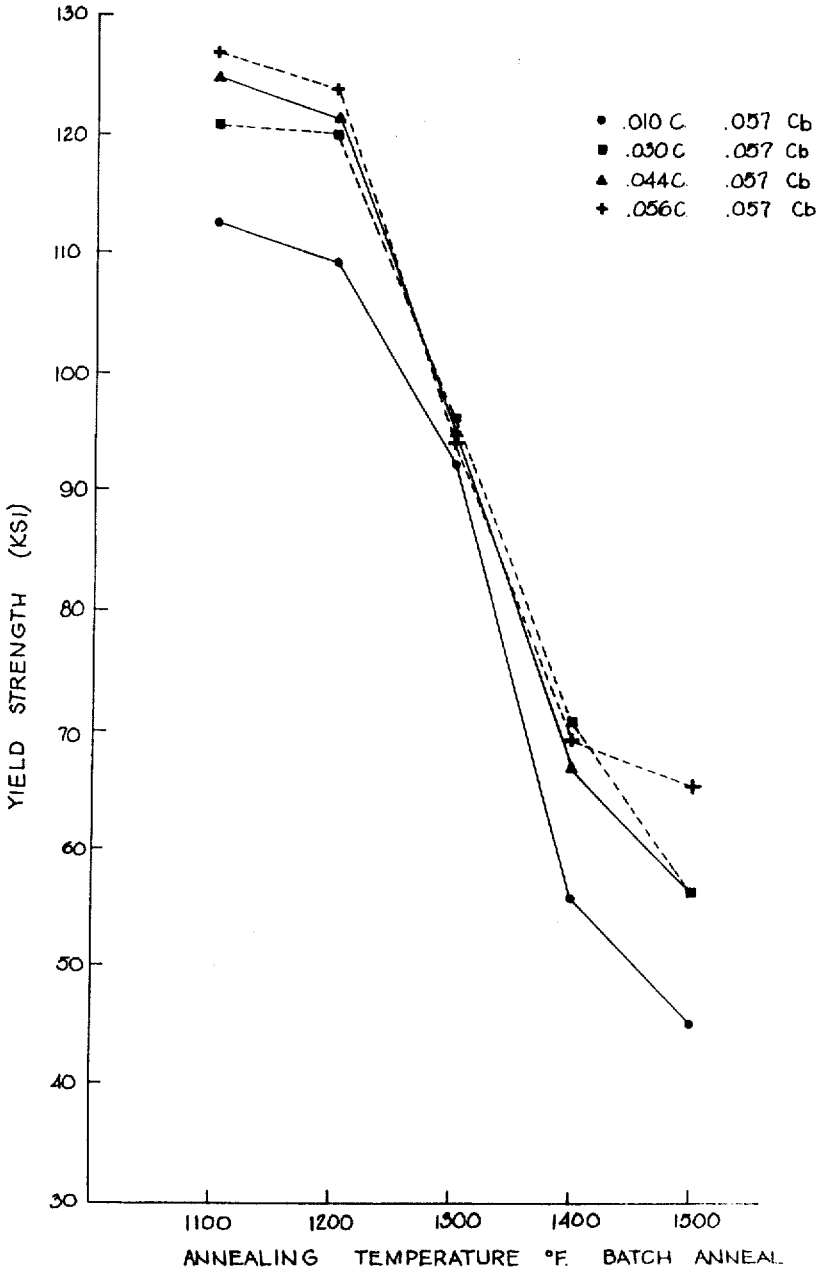

A steel having a composition typical of low carbon rimmed or drawing steel may be melted in an open hearth, basic oxygen furnace or electric furnace. Such a steel, which may be partially deoxidized with aluminum or silicon, is then preferably vacuum degassed to a carbon content ranging between 0.02% and about 0.10%, and sufficient aluminum (or equivalent nitride former) is added to combine completely with the residual nitrogen which typically will be up to about 0.004%. Columbium is then added, either during the degassing or in the ladle or mold, with proper distribution means. The molten steel may either be teemed into ingot molds or continuously cast.

The minimum carbon and columbium contents of the steel must be considered critical. The maximum columbium addition must be restricted to a level which, for a given carbon content, will result in substantially no uncombined columbium, as determined by alalysis at room temperature. In other words, the columbium content will not exceed about 7.75 times the carbon content.

Since nitrogen is substantially completely combined with aluminum, or other nitride formers, the formation of columbium nitrides or carbonitrides is minimized, and the columbium is substantially completely combined as columbium carbide.

In the product and process of the present invention, it has been found that carbon at lower levels has an effect in strengthening the steel. More specifically, in the range of about 0.01% to about 0.025% carbon a strengthening effect is obtained. At carbon levels above about 0.025%, however, carbon contributes nothing further in strengthening steel (as shown in FIG. 2) within the yield strength range of the invention, and further strengthening becomes an almost linear function of the columbium content. Accordingly, the maximum carbon content of 0.10% is not considered critical, although it is preferred that carbon be varied directly in proportion to columbium so as to provide up to 0.025% uncombined carbon (i.e., in excess of that combined with columbium).

Although the composition is not otherwise considered critical except for the above discussed relationship between the carbon and columbium contents, nevertheless optimum properties are achieved with the following preferred composition, in weight percent:

| | | | |
|---|---|---|---|
| carbon | 0.03–0.05% | aluminum | 0.03–0.05% |
| manganese | 0.3–0.6% | nitrogen | 0.004% max. |
| columbium | 0.04–0.12% | oxygen | 0.01% max. |
| phosphorus | 0.006–0.01% | silicon | 0.1% max. |
| sulfur | 0.01–0.017% | iron | balance |

Manganese is purposefully added to prevent hot shortness and to increase the tensile strength. An addition of from 0.1% to 0.9%, and preferably from 0.3% to 0.6% by weight, is adequate for these purposes.

The preferred phosphorus, sulfur, nitrogen and oxygen ranges set forth above are typical of residual values which are attained in a vacuum degassed low alloy steel. Silicon will also be present in residual amounts unless purposefully added (in amounts up to 0.1%) as a deoxidant.

Zirconium is known to possess the same effect as columbium in increasing the recrystallization temperature of low carbon steels, and hence it is within the scope of the present invention to substitute stoichiometrically equivalent amounts of zirconium in place of columbium, at least in part.

Titanium may be substituted in place of aluminum as a nitride former in stoichiometrically equivalent amounts, but it should be recognized that titanium does not have the same effect as columbium and zirconium in increasing the recrystallization temperature. Hence, titanium is not a substitute for columbium in the steel of the present invention.

Silicon may be substituted for aluminum, as a deoxidant, and if this is done, preferably enough titanium is added to combine with the residual nitrogen in the melt.

Rare earth metals or mischmetal may be added for sulfide shape control where optimum transverse mechanical properties are desired.

From the processing standpoint, it has been found that the hot rolling finishing temperature has little or no effect on properties so long as a finishing temperature of about 1650° F. is not exceeded. Accordingly, conventional finishing temperatures within the range of about 1550° to 1650° F. may be practiced. Coiling temperature cannot exceed about 1300° F. and preferably should not exceed about 1200° F.

Ductility of the final product has been found to be independent of the finishing and coiling temperatures.

The amount of cold reduction must be at least 40% but may not exceed about 70%. Preferably cold rolling will be carried out with a reduction in thickness of 45% to 55%, in one or more stages. If the maximum of 70% reduction in thickness is necessary for certain final products, a longer or higher temperature anneal may be needed in order to restore ductility to the desired values, as shown in FIG. 1 and in Table II. For a given yield strength, greater ductility is obtained at 50% cold reduction than at 60%.

The annealing range of the cold rolled material has been found to be critical. Either a continuous or an open coil anneal may be practiced, although an open coil anneal is preferred for material having a yield strength of at least 90 ksi and greater than 10% elongation. An open coil or box anneal ranging from about 1100° F. with a time at temperature up to 24 hours, to about 1200° F. with a time at temperature of less than one-half hour, has been found to be satisfactory. Preferably the open coil anneal is conducted at 1100° F. with a time at temperature of about one-half hour. Time at temperature will thus be generally inversely proportional to the temperature. A continuous anneal at about 1300° F. with a time at temperature of about 7–10 minutes can also be practiced.

When conducted under the above described conditions, the cold rolled strip and sheet stock will recover ductility to an elongation value of greater than 10% while retaining a yield strength of at least 90 ksi. The product has a substantially unrecrystallized microstructure.

In producing cold rolled strip and sheet stock having a yield strength of about 45 to 65 ksi and greater than 25% elongation, all steps up through the cold rolling remain the same as those described previously, and the broad composition remains the same.

For this embodiment either continuous, open coil, or batch annealing can be practiced although batch annealing is preferred. When using batch annealing or open coil annealing, a temperature range of about 1200° to about 1400° F. should be observed. The annealing time will be inversely proportional to temperature with a minimum of 4 hours required for 1200° F., or a minimum of one-half hour above 1250° F. If a continuous anneal is practiced, a temperature of about 1500° to 1700° F. for about 7 to 10 minutes at temperature has been found to be satisfactory.

Under these conditions, the cold rolled strip and sheet stock is fully recrystallized and has a yield strength of about 45 to 65 ksi, with greater than 25% elongation.

Figure 4:
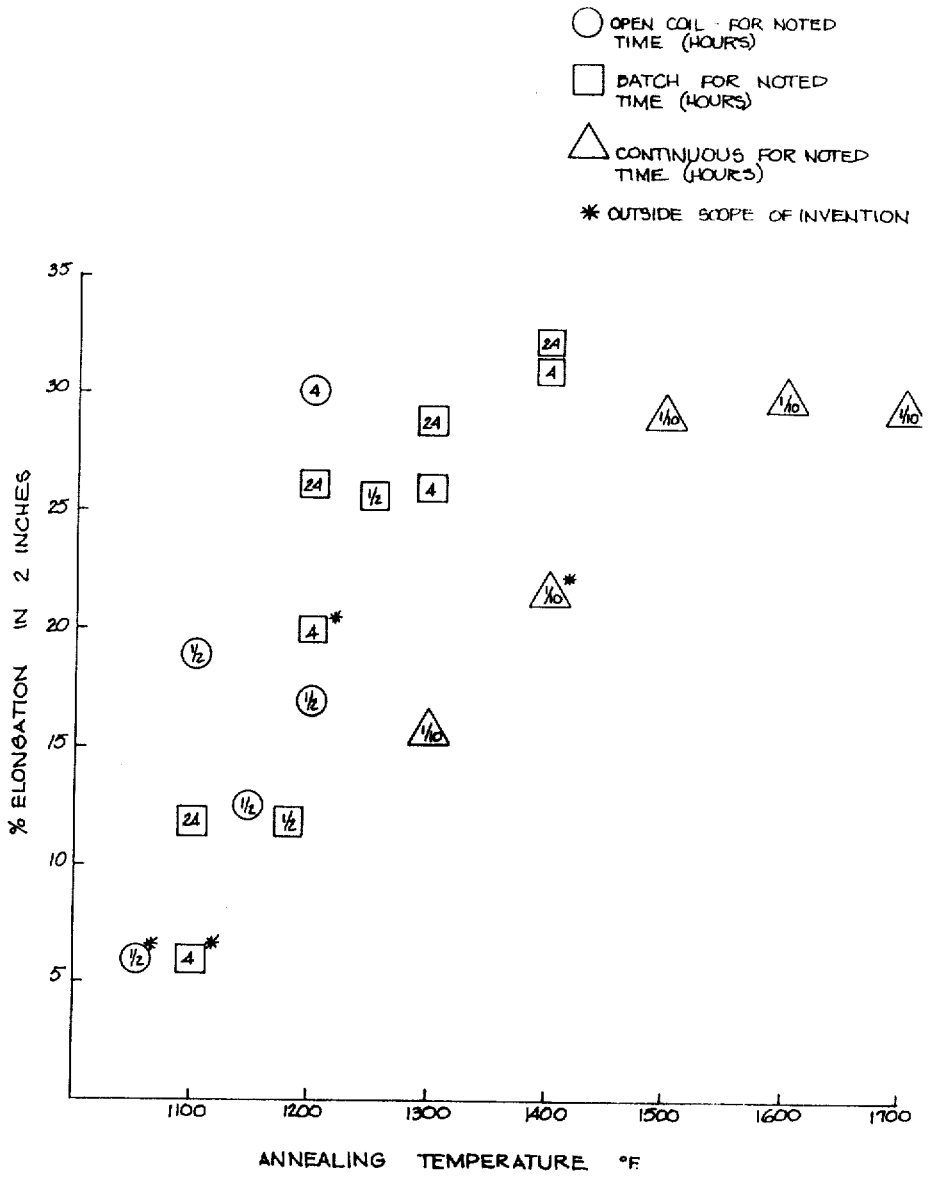
FIG. 4 is a graphic representation of percent elongation vs. annealing temperature of steels processed both within and outside the invention.

Although not wishing to be bound by theory, it is believed that the addition of columbium increases the recrystallization temperature of the steel without affecting the rate of recovery of ductility of the cold rolled material by means of the the low temperature anneal. In addition, as pointed out previously, columbium increases the yield strength of the steel above the initial increment of increase attributable to the presence of carbon in amounts up to about 0.025%. Accordingly, by raising the recrystallization temperature, a range of about 200 Fahrenheit degrees is available within which to carry out the anneal which results in recovery of ductility, while still avoiding recrystallization and thereby retaining a yield strength of at least about 90 ksi. The recovery rate is relatively rapid within the temperature range of 1000° to 1150° F., but substantially no recrystallization occurs. When the annealing time and temperature are sufficient for complete recrystallization, the product will have a yield strength between 45 and 65 ksi as indicated in FIGS. 2 and 4.

From the above description, it will be recognized by those skilled in the art that the cold rolled strip and sheet stock can be metallic coated by continuous processes of the so-called out-of-line anneal or preanneal type without substantially changing the mechanical properties. Such processes include, but are not limited to, hot dip coating in molten metal, and electroplating wherein the preliminary coating line treatment is usually wet chemical cleaning. Preanneal dip coating processes may then incorporate either strip fluxing or strip heating in a hydrogen-inert gas atmosphere prior to coating and involve a maximum in-line strip temperature approximately equal to molten metal bath temperature, which is usually maintained about 50° to 100° F. above the melting point of the coating metal. Metals which may be used for continuous preanneal dip coating processes include aluminum, zinc, alloys of aluminum or zinc, or terne. Metals commonly used for continuous strip electroplating include zinc and terne.

It is a further feature of the invention that continuous heat treatments for recovery of ductility or for recrystallization of the cold rolled steel may be carried out as an integral part of a so-called in-line anneal hot dip metallic coating process. Such processes do not utilize chemical fluxes but are characterized by furnace processing for surface preparation with simultaneous heat treatment. Exemplary processes include, but are not limited to the Sendzimir, the Armco-Selas, and the U.S. Steel processes. These differ primarily in the manner of removal of residual cold rolling mill oil and related surface contaminants. The Sendzimir process employs strip heating to 700°-900° F. to form a light surface oxide, the Armco-Selas process utilizes high intensity direct fuel-fired heating to 1000°-1400° F. without strip oxidation; the U.S. Steel method utilizes wet chemical cleaning.

These oil removal steps are followed by heating in similar hydrogen-inert gas atmosphere furnaces capable of reducing residual surface oxide wherein the strip is brought to the 1100°-1150° F. range required for recovery or to the 1600° F. range (for continuous annealing) for the fully recrystallized product of the invention. Heating is followed by furnace cooling approximately to bath temperature and hot dip coating. Coating metals suitable for continuous in-line anneal hot dip coating processes include aluminum, zinc, alloys of aluminum or zinc, or terne.

In all the above-described processes the formation of an interfacial alloy layer between the steel substrate and the coating metal is substantially completely avoided.

The present invention thus provides a coated strip and sheet product, having yield strengths ranging between 45 and 65 ksi with elongation values greater than 25%, and yield strengths of at least 90 ksi with elongation values greater than 10%, comprising an outer layer of aluminum, zinc, alloys of aluminum or zinc, or terne, and an inner substrate or base of cold reduced steel strip and sheet having the broad composition set forth above, with substantially no interfacial alloy layer therebetween.

It has been found that the weldability of cold reduced strip and sheet material of the present invention is excellent. The yield strength remains substantially at its original value in the heat affected zone of the weldment, although the ductility decreases in the heat affected zone.

Several mill heats have been prepared and processed in accordance with the invention and are set forth below as exemplary but non-limiting embodiments.

EXAMPLE 1

A heat was melted and refined in a basic oxygen furnace, vacuum degassed with aluminum and columbium (in the form of ferrocolumbium) additions in the vacuum degasser, to provide a melt having the following ladle analysis, in weight percent:

| | |
|---|---|
| C | 0.037% |
| Mn | 0.59 |
| N | 0.0036 |
| S | 0.010 |
| P | 0.006 |
| Si | 0.012 |
| Cb | 0.099 |
| Al | 0.047 |
| Fe | balance, except for incidental impurities. |

The melt was cast into ingots, solidified, reduced to slabs, and hot rolled to 0.114–0.120 inch thicknesses. The hot rolling finish temperature was 1600° F., and the coiling temperature was 1200° F.

After scale removal the hot rolled material was cold rolled to final thicknesses of 0.003, 0.036, and 0.052 inch, these cold reductions ranging from 60% to 70%.

The sheet analysis was as follows, in weight percent:

| | |
|---|---|
| C | 0.040% |
| Mn | 0.60 |
| N | 0.0048 |
| S | 0.013 |
| P | 0.004 |
| Si | 0.010 |
| O | 0.0013 |

-continued

| | |
|---|---|
| Cb | 0.11 |
| Al | 0.048 |
| Fe | balance |

Samples were subjected to various annealing treatments, as follows:

1100° F. for ½ hour - open coil anneal for 90+ ksi Y.S.,10%min.Elong.

1200° F. for 4 hours - open coil anneal for 45-65 ksi Y.S.,25%min.Elong.

EXAMPLE 2

Another heat was melted and vacuum degassed in the same manner as Example 1 to obtain a melt having the following ladle analysis:

| | |
|---|---|
| C | 0.038% |
| Mn | 0.51 |
| N | 0.0028 |
| S | 0.012 |
| P | 0.006 |
| Si | 0.010 |
| Cb | 0.088 |
| Al | 0.078 |
| Fe | balance, except for incidental impurities. |

The melt was poured into ingots, rare earth metal silicide additions were made to the ingots, and slabs were hot rolled to several different gages ranging from 0.093 to 0.120 inch, with hot rolling finish temperatures of 1600°-1650° F., and coiling temperatures ranging from 1120° to 1190° F. The rare earth metal addition was made for sulfide shape control.

Cold rolling was carried out as follows:

0.046 inch - 50% reduction 0.036 inch - 60% reduction 0.028 inch - 70% reduction The sheet analysis was as follows:

| | | | |
|---|---|---|---|
| C | 0.045% | Cb | 0.094% |
| Mn | 0.53 | Al | 0.070 |
| N | 0.0063 | Ce | 0.027 |
| S | 0.010 | La | 0.015 |
| P | 0.008 | Fe | balance |
| O | 0.009 | | |

Annealing treatments were as follows-continuously annealed 8 minutes at 1300°, 1400°, 1500°, 1600° and 1700° F.;

batch annealed at various temperatures from 1100° to 1400° F. for times ranging from ½ to 24 hours.

Mechanical properties of cold rolled samples of the steel of Examples 1 and 2 are set forth in Table I. It will be noted that in all embodiments processed in accordance with the invention in which the yield strength was at least 90 ksi the percent elongation exceeded 10%, while in embodiments processed in accordance with the invention in which the yield strength was 45 to 65 ksi, the percent elongation exceeded 25%. In contrast to this, in Example 2, the specimen continuously annealed at 1400° F. for 8 minutes exhibited a yield strength of 68.8 ksi and an elongation of 22%, similarly, the specimen box annealed at 1200° F. for 4 hours showed 75.9 ksi yield strength and an elongation of 20%, thus indicating a partially recrystallized product outside the scope of the invention. Specimens from Example 2 open coil annealed at 1050° F. for one-half hour, and box annealed at 1100° F. for 4 hours, respectively, exhibited elongations less than 10% which represent incomplete recovery, and are also outside the scope of the invention. The processing ranges of the invention will yield a material with either a recovery anneal or fully recrystallized anneal properties. Between these two conditions, however, the partially recrystallized product is outside the scope of the invention.

The data of Table I are represented graphically in FIG. 4 as a function of percent elongation vs. annealing temperature with yield strengths, times and types of anneals also being shown. It will be apparent from Table I and FIG. 4 that a temperature range of from about 1100° F. with a time at temperature up to about 24 hours, to about 1300° F. with a time at temperature of about 7 to 10 minutes, results in an unrecrystallized product having a yield strength of at least 90 ksi and a percent elongation greater than 10%. An open coil anneal at about 1100° F. with a time at temperature of about one-half hour is preferred.

A temperature range of from about 1200° F. to about 1700° F., with a time at temperature of at least about 4 hours at 1200° F. to about 7 to 10 minutes at 1700° F., results in a recrystallized product having a yield strength of about 45 to 65 ksi and a percent elongation greater than 25%. A batch or box anneal at about 1400° F. with a time at temperature of about 4 hours is preferred.

TABLE I

Mechanical Properties
Steels Processed in Examples 1 & 2

| Example | Annealing Temperature | Time | 0.2% YS (ksi) | % Elong. in 2" |
|---|---|---|---|---|
| | | Open Coil Annealing | | |
| 2 | 1050° F. | ½ hr | 125.1 | 6* |
| 1 | 1100° F. | ½ hr | 101.5 | 18 |
| 2 | 1150° F. | ½ hr | 120.0 | 12 |
| 2 | 1200° F. | ½ hr | 94.0 | 17 |
| 1 | 1200° F. | 4 hr | 54.0 | 30 |
| | | Batch Anneal | | |
| 2 | 1100° F. | 4 hr | 122.0 | 6* |
| 2 | 1100° F. | 24 hr | 94.6 | 12.5 |
| 2 | 1180° F. | ½ hr | 119.9 | 12.5 |
| 2 | 1200° F. | 4 hr | 75.9* | 20 |
| 2 | 1200° F. | 24 hr | 64.5 | 26.5 |
| 2 | 1250° F. | ½ hr | 62.8 | 25.5 |
| 2 | 1300° F. | 4 hr | 63.7 | 26 |
| 2 | 1300° F. | 24 hr | 55.9 | 28 |
| 2 | 1400° F. | 4 hr | 53.6 | 31 |
| 2 | 1400° F. | 24 hr | 53.5 | 32 |
| | | Continuous Anneal | | |
| 2 | 1300° F. | 8 min. | 95.4 | 16 |
| 2 | 1400° F. | 8 min. | 68.8* | 22 |
| 2 | 1500° F. | 8 min. | 59.3 | 28 |
| 2 | 1600° F. | 8 min. | 51.5 | 29.5 |
| 2 | 1700° F. | 8 min. | 53.5 | 28.5 |

*Outside the scope of the invention

The graph of FIG. 1 illustrates the effect of annealing temperature and time on yield strength of 50% and 70% cold reduced specimens of Example 2. This indicates that a temperature up to about 1150° F. would require in excess of 4 hours to reduce the yield strength to less than 90 ksi, whereas 24 hours at about 1150° F. reduces the yield strength to about 80 ksi. It is therefore apparent that the recrystallization rate is slow within the range of about 1100° to about 1175° F., the process of the invention can thus tolerate operating variables of relatively large magnitude without adverse effect.

The effect of percent of cold reduction on yield strength and ductility is shown by the test results summarized in Table II for unrecrystallized material having a yield strength of at least 90 ksi, the test specimens having the composition of Example 1 above. It will be noted that 40% cold reduction is necessary in order to achieve the desired properties and that the ductility is decreased with 60%-70% cold reduction, although such material can be brought within the desired minimum of greater than 10% elongation by annealing at somewhat higher temperature and/or for a longer time. As expected, yield and tensile strengths increased with higher cold reductions. The properties were also found to be relatively independent of the coiling temperature, at least up to about 1300° F.

TABLE II

| Process Conditions | % C.R. | 0.2% Y.S. ksi | T.S. | % Elong. in 2" |
|---|---|---|---|---|
| H.R. Finish 1600° F.; | 40 | 99.9 | 103.0 | 14 |
| Coil at 1100° F.; | 50 | 105.4 | 106.3 | 11 |
| O.C. Anneal 1100° F. | 60 | 111.5 | 112.5 | 8 |
| for ½ hr (lab. simulated) | 70 | 111.1 | 111.1 | 6 |
| H.R. Finish 1600° F.; | 40 | 99.4 | 102.8 | 13 |
| Coil at 1200° F.; | 50 | 102.5 | 105.7 | 12 |
| O.C. Anneal 1100° F. | 60 | 109.1 | 110.3 | 12 |
| for ½ hr (Lab. simulated) | 70 | 110.1 | 110.1 | 6 |
| H.R. Finish 1600° F.; | 40 | 97.6 | 100.5 | 11 |
| Coil at 1300° F.; | 50 | 97.0 | 100.2 | 11 |
| O.C. Anneal 1100° F. | 60 | 100.1 | 102.1 | 13 |
| for ½ hr (lab. simulated). | 70 | 102.5 | 102.5 | 8 |

Similar tests were conducted on 45-65 ksi specimens of Example 2 above, coiled at 1100°-1300° F., cold reduced 40%, 50%, 60% and 70% and box annealed (lab. simulated) at 1250° F. for 4 hours. It was found that the different percentages of cold reduction caused no differences in yield strength, tensile strength, percent elongation and hardness. In other words, all specimens were at substantially the same levels after annealing.

The effect of variation in the carbon and columbium contents on yield strength was also investigated. For these tests a series of laboratory heats were prepared, adding a different columbium content to each heat and casting 4 ingots from each heat, each ingot being at a different carbon content.

The laboratory heats were vacuum melted, cast into ingots, hot rolled to 0.10 inch, finishing at 1600° F. and coiling at 1100° F., cold rolled to 0.04 inch gage, a reduction of 60%, and annealed under a variety of conditions. Specimens were subjected to a simulated box anneal of 24 hours at 1100°, 1200°, 1300°, 1400°, and 1500° F., and air cooled.

The cold rolled sheet compositions of the various samples were as follows, in weight percent:

| Ingot | C | Cb |
|---|---|---|
| | Example 3 | |
| 1 | 0.010% | 0.057% |
| 2 | 0.030% | 0.057% |
| 3 | 0.044% | 0.057% |
| 4 | 0.056% | 0.057% |
| | Example 4 | |
| 1 | 0.012% | 0.063% |
| 2 | 0.025% | 0.063% |
| 3 | 0.038% | 0.063% |
| 4 | 0.057% | 0.063% |
| | Example 5 | |

-continued

| Ingot | C | Cb |
|---|---|---|
| 1 | 0.011% | 0.099% |
| 2 | 0.025% | 0.099% |
| 3 | 0.039% | 0.099% |
| 4 | 0.048% | 0.099% |

The chemistry on all three Examples above was 0.55% Mn, 0.002% N, 0.003% S, 0.0009% O and 0.02% Al.

Figure 3:
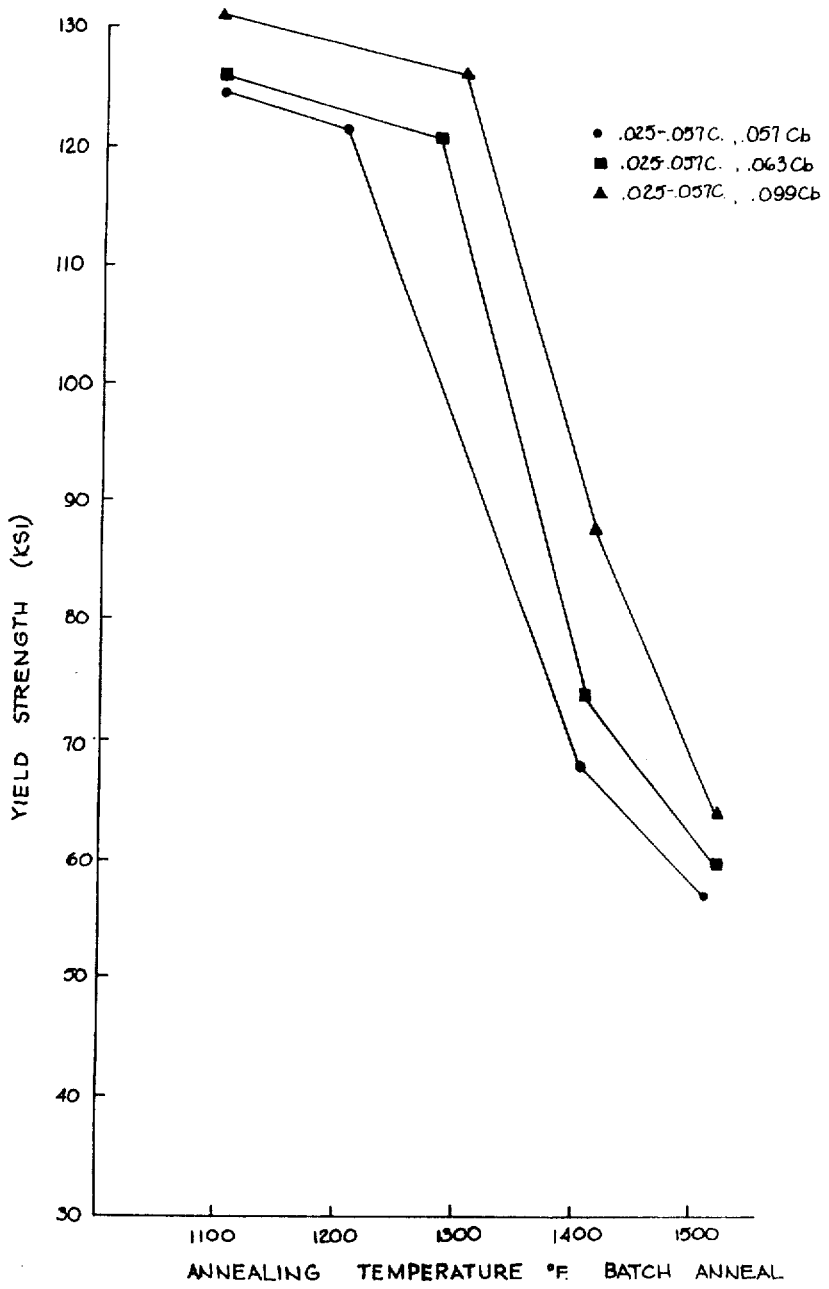

Yield strengths of specimens of the above four ingots of Example 3 vs. annealing temperature are represented in the graph of FIG. 2 of the drawings; (varying carbon and constant columbium contents). FIG. 3 is a graph of similar plots of specimens of ingots of Examples 3, 4 and 5.

It is evident from the plotted values at 1100° and 1200° F. that carbon contributes to the yield strength when present in amounts up to about 0.025% but has less effect at higher carbon levels. Of greater significance is the strengthening effect resulting from progressively increased columbium contents (FIG. 3) and the fact that carbon contents below 0.02% resulted in yield strengths below 90 ksi at 1400° F. annealing temperature regardless of columbium content. This is particularly evident from Example 5-1 wherein the carbon content of less than 0.02% and a columbium:carbon ratio of greater than 7.75:1 (0.099% Cb and 0.011% C) exhibited a yield strength of about 68 ksi at 1400° F. annealing temperature (24 hours).

Modifications may be made without departing from the scope of the invention, and hence no limitations are to be inferred except insofar as specifically set forth in the claims which follow.

We claim:

1. Cold reduced and annealed low carbon steel strip and steel stock *in substantially unrecrystallized form after annealing* having a 0.2% yield strength of [45 to 65 ksi or of] at least 90 ksi, with an elongation in 2 inches of greater than 10% [for at least 90 ksi yield strength and greater than 25% for 45 to 65 ksi yield strength], consisting essentially of, by weight percent, from 0.02% to about 0.10% carbon, about 0.1% to about 0.9% manganese, 0.02% to about 0.18% columbium, residual phosphorus, sulfur, silicon, oxygen and nitrogen, about 0.01% to about 0.08% aluminum, and balance essentially iron except for incidental impurities, with the columbium being substantially completely combined.

2. Strip and sheet stock as claimed in claim 1, [in substantially unrecrystallized form after annealing] having a 0.2% yield strength of about 90 to about 120 ksi and an elongation in 2 inches of greater than 10%.

3. Strip and sheet stock as claimed in claim 2, consisting essentially of from about 0.03% to about 0.05% carbon, about 0.3% to about 0.6% manganese, about 0.04% to about 0.12% columbium, about 0.006% to about 0.01% phosphorus, about 0.01% to about 0.017% sulfur, about 0.004% maximum nitrogen, about 0.03% to about 0.05% aluminum, about 0.01% maximum oxygen, about 0.1% maximum silicon, and balance essentially iron.

[4. Strip and sheet stock as claimed in claim 1, in substantially fully recrystallized form after annealing, having a 0.2% yield strength of 45 to 65 ksi and an elongation in 2 inches of greater than 25%.]

5. Strip and sheet stock as claimed in claim [4] *11*, consisting essentially of from about 0.03% to about 0.05% carbon, about 0.3% to about 0.6% manganese, about 0.04% to about 0.12% columbium, about 0.006% to about 0.01% phosphorus, about 0.01% to about 0.017% sulfur, about 0.004% maximum nitrogen, about 0.03% to about 0.05% aluminum, about 0.01% maximum oxygen, about 0.1% maximum silicon, and balance essentially iron.

6. Strip and sheet stock as claimed in claim [1] *3*, wherein zirconium is partially substituted for columbium on a stoichiometrically equivalent basis.

7. Strip and sheet stock as claimed in claim 1, wherein titanium is substituted for aluminum on a stoichiometrically equivalent basis.

8. A coated product comprising an outer layer chosen from the group consisting of aluminum, zinc, alloys of aluminum, alloys of zinc, and terne, and an inner substrate of cold reduced and annealed steel strip and sheet stock *in substantially unrecrystallized form having a 0.2% offset yield strength of at least 90 ksi and an elongation in 2 inches of greater than 10%, said sheet stock* consisting essentially of, by weight percent, from 0.02% to about 0.10% carbon, about 0.1% to about 0.9% manganese, 0.02% to about 0.18% columbium, residual phosphorus, sulfur, silicon, oxygen and nitrogen, about 0.01% to about 0.08% aluminum, and balance essentially iron except for incidental impurities, with the columbium being substantially completely combined, there being substantially no interfacial alloy layer.

9. The product claimed in claim 8, wherein said outer layer has been applied by fluxless hot dip metallic coating.

10. The product claimed in claim 8, wherein said substrate consists essentially of, by weight percent, from about 0.03% to about 0.05% carbon, about 0.3% to about 0.6% manganese, about 0.04% to about 0.12% columbium, about 0.006% to about 0.010% phosphorus, about 0.01% to about 0.017% sulfur, about 0.04% maximum nitrogen, about 0.03% to about 0.05% aluminum, about 0.01% maximum oxygen, about 0.1% maximum silicon, and balance essentially iron.

*11. Cold reduced and annealed low carbon steel strip and sheet stock in substantially fully recrystallized form after annealing, having a 0.27%, offset yield strength of 45 to 65 ksi and an elongation in 2 inches of greater than 25%, said strip and sheet stock being produced from hot rolled steel coiled at 1000° to 1300° F., and consisting essentially of, in weight percent, from 0.02% to about 0.10% carbon, about 0.1% to about 0.9% manganese, 0.02% to about 0.18% columbium, residual phosphorus, sulfur, silicon, oxygen and nitrogen, about 0.01% to about 0.08% aluminum, and balance essentially iron except for incidental impurities, with the columbium being substantially completely combined.*

*12. Strip and sheet stock as claimed in claim 5, wherein zirconium is partially substituted for columbium on a stoichiometrically equivalent basis.*

*13. Strip and sheet stock as claimed in claim 11, wherein titanium is substituted for aluminum on a stoichiometrically equivalent basis.*

*14. A coated product comprising an outer layer chosen from the group consisting of aluminum, zinc, alloys of aluminum, alloys of zinc, and terne, and an inner substrate of cold reduced and annealed strip and sheet stock in substantially fully recrystallized form after annealing having a 0.2% offset yield strength of 45 to 65 ksi and an elongation in 2 inches of greater than 25%, said sheet stock being produced from hot rolled steel coiled at 1000° to 1300° F. and consisting essentially of, by weight percent, from 0.02% to about 0.10% carbon, about 0.1% to about 0.9% manganese, 0.02% to about 0.18% columbium, residual phosphorus, sulfur, silicon, oxygen and nitrogen, about 0.01% to about 0.08% aluminum, and balance essentially iron except for incidental impurities, with the comumbium being substantially completely combined, there being substantially no interfacial alloy layer.*

*15. The product claimed in claim 14, wherein said substrate consists essentially of, by weight percent, from about 0.03% to about 0.05% carbon, about 0.3% to about 0.6% manganese, about 0.04% to about 0.12% columbium, about 0.006% to about 0.010% phosphorus, about 0.01% to about 0.017% sulfur, about 0.004% maximum nitrogen, about 0.03% to about 0.05% aluminum, about 0.01% maximum oxygen, about 0.15 maximum silicon, and balance essentially iron.*

* * * * *